MANIFOLD CHECKBOOK WITH SELF-RECORDING REGISTER

Filed Sept. 13, 1966 5 Sheets-Sheet 1

INVENTOR
HUGH C. ALEXANDER
BY
Nolte & Nolte
ATTORNEYS

Aug. 1, 1967 H. C. ALEXANDER 3,333,869

MANIFOLD CHECKBOOK WITH SELF-RECORDING REGISTER

Filed Sept. 13, 1966 5 Sheets-Sheet 2

INVENTOR
HUGH C. ALEXANDER
BY
Nolte & Nolte
ATTORNEYS

Aug. 1, 1967 H. C. ALEXANDER 3,333,869

MANIFOLD CHECKBOOK WITH SELF-RECORDING REGISTER

Filed Sept. 13, 1966 5 Sheets-Sheet 3

INVENTOR
HUGH C. ALEXANDER
BY
Nolte & Nolte
ATTORNEYS

INVENTOR
HUGH C. ALEXANDER
BY Nolte & Nolte
ATTORNEYS

MANIFOLD CHECKBOOK WITH SELF-RECORDING REGISTER

Filed Sept. 13, 1966 5 Sheets-Sheet 5

INVENTOR
HUGH C. ALEXANDER
BY Nolte & Nolte
ATTORNEYS

United States Patent Office 3,333,869

Patented Aug. 1, 1967

3,333,869

MANIFOLD CHECKBOOK WITH SELF-RECORDING REGISTER

Hugh C. Alexander, 2660 Briggs Ave., Bronx, N.Y. 10458

Filed Sept. 13, 1966, Ser. No. 579,063
22 Claims. (Cl. 282—24)

ABSTRACT OF THE DISCLOSURE

The present invention relates to a manifold checkbook and self-recording register assembly which includes a pad of checks secured together at one edge and having a mounting portion secured to a bottommost portion of the pad of checks, a record sheet assembly having a plurality of record sheets adapted to be movably superimposed over the pad of checks and being creased to permit folding thereof in half. The record sheets are preprinted on both sides thereof to permit the record assembly to be reversibly inserted within the checkbook. A backing sheet is provided which includes a mounting portion to form a cover portion, and slidable means for mounting said mounting portion are further provided. The present invention includes indicia means on the record sheets and on said checks for indicating registry, means responsive to the writing on the face of the check for producing an image of such writing on the record sheets and a cover which will enclose the assembly.

This application is a continuation-in-part of copending application Ser. No. 450,666 filed Apr. 26, 1965, now abandoned.

This invention relates to checks and similar documents and has particular reference to the type of checkbook primarily adapted for personal use as distinguished by use in business houses although the principle may be adapted to the latter use if desired.

Checkbooks, as now made for carrying on the person, usually comprise a pad of checks, each one of which is attached to a stub or counterfoil upon which the user is supposed to enter the date, amount, and payee as he fills out the check. There is another type of checkbook, which has been popular in recent years, which includes merely a pad of checks and a separate booklet with lines for entering the material ordinarily put on the stub of a check.

Both of the above record keeping devices permit omission or inaccuracy of the record entries. In order for the record to be accurate, it is necessary that each check be recorded as drawn, which is often not done because of haste in the transaction involved. The check can, of course, be negotiated without such entry in the record kept by the drawer, and entry forgotten or made from memory. Since most checkbooks also provide for entry of deposits and balances in the account, the balance will be incorrect if the disbursement record is incorrect.

In view of the above considerations, it is the primary object of the present invention to provide a novel checkbook in which entries in a permanent record, retained by the drawer, are made by the mere act of filling out the check, to thus eliminate the time required to fill in the check record or stub as well as the possibility of transcription errors.

It is a further object of the present invention to provide a checkbook with check record keeping means which requires no entries other than the entries made in filling out the check itself.

It is a further object of the present invention to have the record retained by the issuer of a check in such a form that it can be readily worked up and in which after the writing of each check, the balance remaining in the account is readily ascertainable and dependable.

Other objects and advantages will become apparent as this description proceeds.

Turning now to the drawings forming part of this specification:

Checks, as distinguished from most other documents, require a reverse side upon which certain entries can be made after issuance. Accordingly, they cannot be coated with carbon on the reverse; and furthermore, such coating, if present on the back of each of a pad of checks, would, without elaborate precautions, result in superimposition of writing on the uppermost check on whatever is under the second and lower checks.

The present invention depends for its practicability upon certain types of paper with complementary coatings, for copying purposes, on opposite surfaces of two sheets of paper and a simple and dependable movable means to align a pad, or multiple sheets, of each of these two different coated papers to various predeterminable fixed positions whereby the uppermost sheet of each pad may be easily brought into or out of complementary coated relation for copying or non-copying.

This paper depends for its usefulness upon complementary coatings on the surfaces of two sheets of paper in contact, of such a nature that writing pressure on the upper sheet causes the appearance of an image of what is written on one of the contacting surfaces. Ordinarily, this is the upper surface of the second sheet, which thus receives the equivalent of a carbon copy, without, however, the presence of any visible image transferring medium between the sheets. It should be noted that it is necessary that both coatings be in contact with each other for any results to occur from writing on the upper sheet. In other words, a plurality of superimposed sheets having proper coatings on the backs thereof can be written upon without the formation of an image, unless there is present in the pile a sheet of paper having a coating on its upper surface to result in the formation of an image thereupon.

Figures 1, 2, 3, 7:
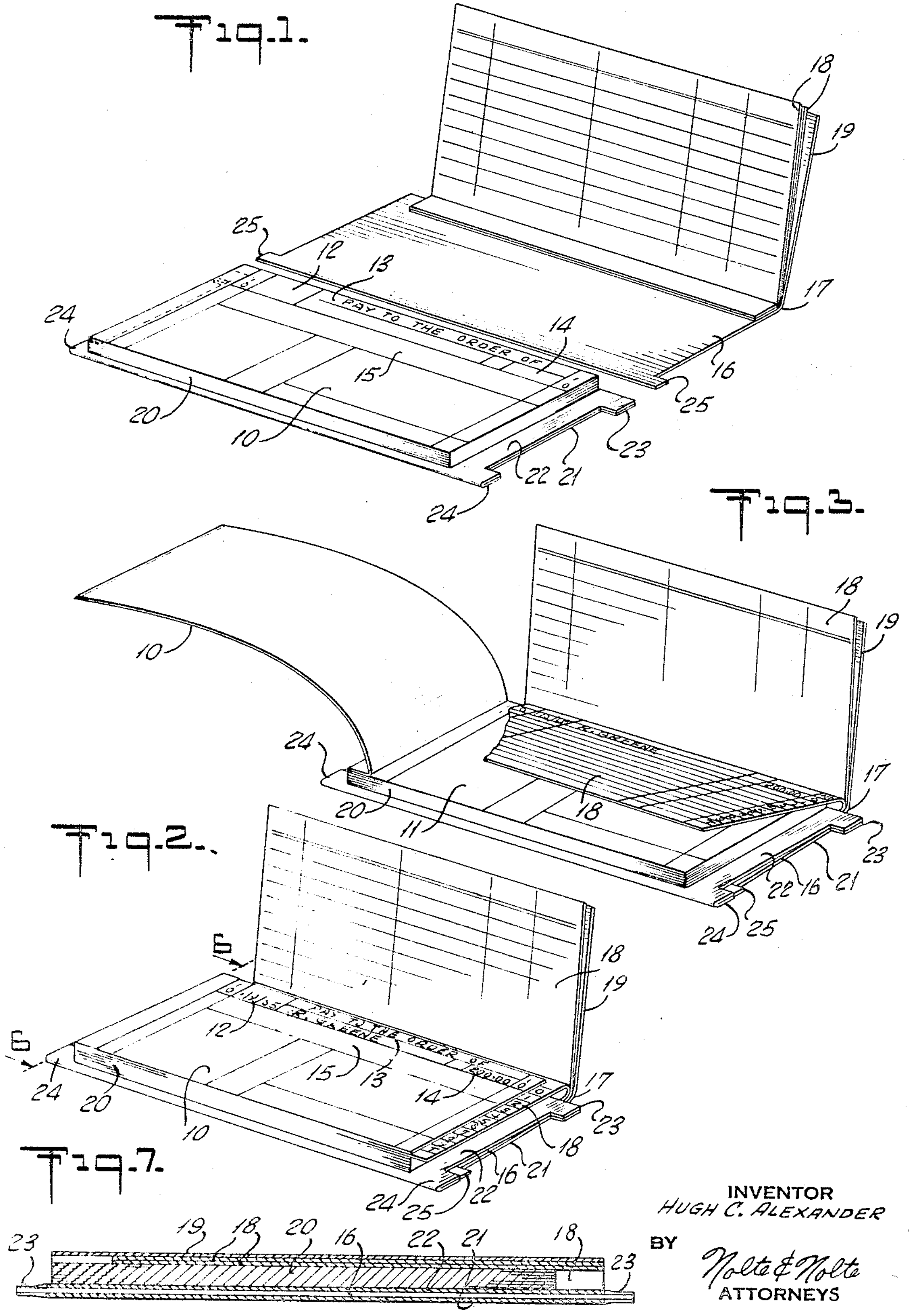
FIG. 1 shows a preferred form of the present invention with the parts thereof separated in order to show more readily the mechanical constructions.
FIG. 2 is a view similar to FIG. 1 showing the parts as an integral unit shown in use with writing on the top check.
FIG. 3 is a view showing the image or copy on the record sheet after the top check is written upon and lifted.
FIG. 7 is a section taken on line 7—7 of FIG. 6.

The present invention involves the utilization of the material just described in a novel form of check and record keeping means. It is well known that the issuer of a check requires, for most purposes, merely the date, amount, and payee, adding for convenience the number of the check and the purpose for which it was drawn. In some devices embodying the present invention, each check is numbered, and the spaces for the date, amount and payee are preferably arranged a little differently than has been customary in the past, but the arrangement is still one which is readily recognizable as a check and one which does not render the document unnegotiable. Each check is numbered preferably on each end. By way of example, the check is shown in FIGS. 1 and 2 (reference numeral 10) and is partly shown in FIG. 3 (reference numeral 11). A space 12 is provided on the check shown intended for the date, space 13 for the name of payee, and space 14 for the entry of the amount of the check being filled out. A space 15 is provided for utilization in the customary manner of spelling out the amount to be paid. The signature of the payor and the name and address of the bank may appear where convenient.

It will be noted that the arrangement of the check as above set forth places all of the data which the issuer wishes to duplicate in his records on a single line. The spelled out amount and his signature are of course extraneous as far as his own records are concerned. If the back of each check is coated with one of the two complementary coatings which are necessary to produce an image on a second coated sheet of paper, writing on the top check of a pad of checks will produce no effect on any check beneath it as the surface of the check is free of the proper material. If there is now placed under the check a sheet of paper coated on its face with the coating complementary to that on the back of the check, anything which is written on the check will appear on this sheet of paper. This is taken advantage of in the manner shown in FIG. 3. A booklet of record pages with numbered lines corresponding to the numbers of the check is provided with proper spaces for the entry of the date, the payee and the amount as they are written in the spaces 12, 13 and 14 of the check. If the appropriate page is laid under the check being written or even under a check therebelow and the record sheet is adjusted in an up and down direction to bring the proper line for receipt of the information to be entered in line with the spaces 12, 13 and 14, the pertinent data will be automatically transferred to the record page as the check is written.

The present invention contemplates a structure which renders such registry simple and easy. The booklet of record pages may comprise a relatively stiff element 16 which is hinged at 17 to form a cover 19. A booklet 18 of record pages ruled as described with numbered lines corresponding to the numbers on the checks is secured near hinge 17. These record pages may be made longer and secured to lower edge of element 16.

A pad of checks 20 is secured to a base member which is preferably of a double thickness, thus providing a pair of members 21 and 22 between which is intended that the member 16 secured to the booklet is to be inserted in assembling the device. Member 16 may be simply inserted between the members 21 and 22, but it is desired to prevent separation of the booklet from the pad of checks at all times. Accordingly, the double sheets may be cut back or recessed, leaving projecting ears 23, 24 on the side margins near the top and bottom. The sheet 16 also has its side margins recessed to leave projecting ears 25 at each side. The device is assembled by inserting sheet 16 between the cover sheets 21 and 22, after which the upper projections 23 of the double sheet may be secured by stapling or the like. The resulting structure is then one in which the booklet becomes an inseparable part of the check pad but is at the same time slidingly movable up and down to permit the registry of a selected line of the record page with the aligned spaces provided on the check for entering the data referred to.

Figures 4, 5, 6:
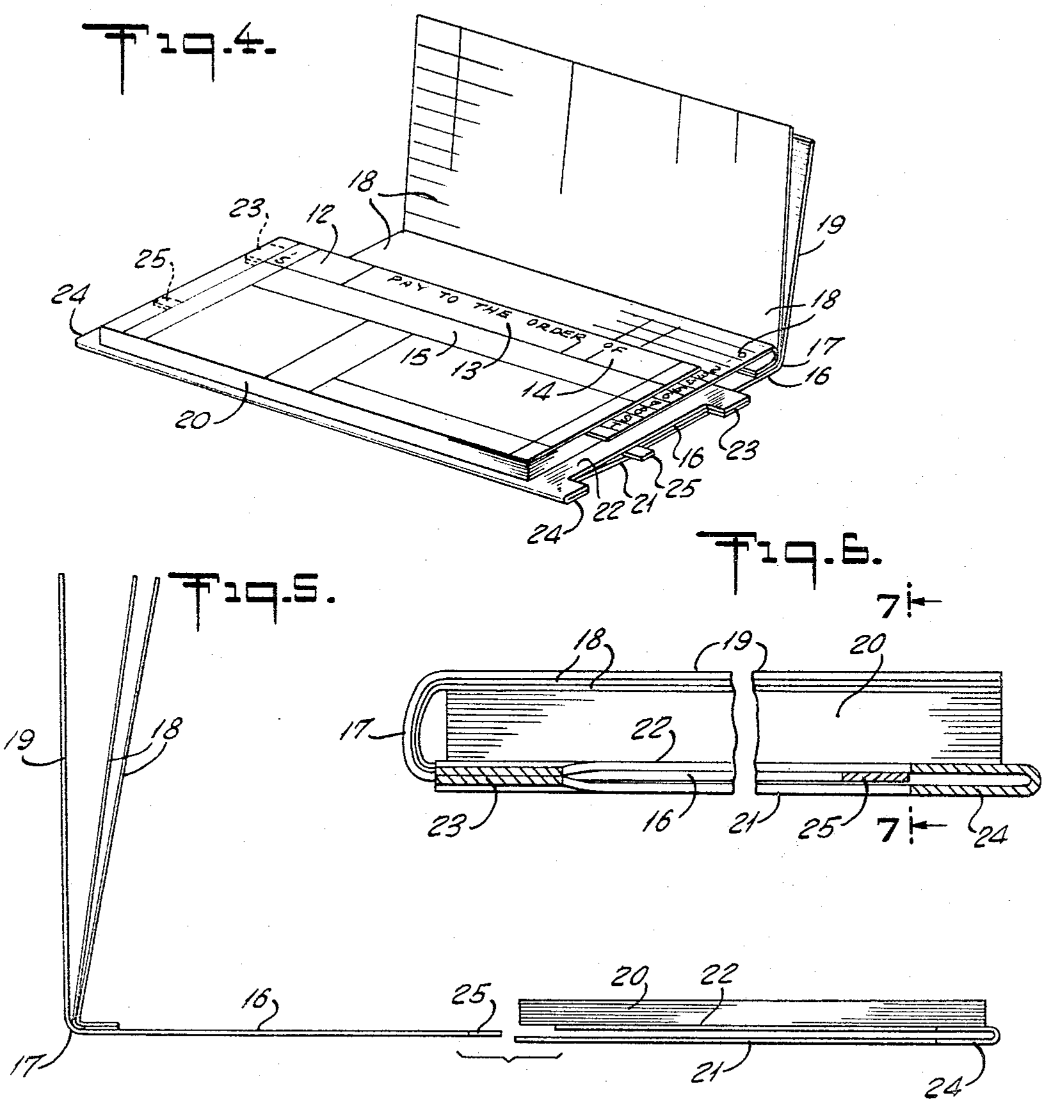
FIG. 4 is a view somewhat similar to FIG. 2 showing the appearance of the parts in writing a check other than the original first check in the pad.
FIG. 5 is an end view of the device shown in FIG. 1 in disassembled condition.
FIG. 6 is a section taken on line 6—6 of FIG. 2.

As shown in FIG. 4, it is most convenient to number the lines of the record pages in a region projecting slightly from the end of the check pad for proper registry. As shown in FIG. 4, which is intended to show Check No. 5 being written, it is merely necessary to align the numeral 5 on the record page with the numeral 5 on the check in order to assure that the entry is made in the proper position in the record. As shown in the figures, the underside of the record pages may be ruled for the entry of receipts or deposits in the checking account, or for any other bookkeeping chore which it is desirable to perform in connection with the record.

It is understood of course that the written description of the sum to be paid and the drawer's signature should not be written while the check is still in position over the record page, if the back of the check is completely covered with the coating described. The coating might be limited to a strip of only sufficient width to back the spaces 12, 13 and 14 to thus prevent the drawer's signature from appearing on the record page. If uniformly coated check paper is used, the drawer can simply lift the record page from under the check before completing it with his signature and the written amount. Alternatively, the check can be torn from the book and completed. It will be noted that, as best seen perhaps in FIG. 5, the record pages are secured at the hinge 17 and folded over. This is for the purpose of imparting a tendency for the record pages 18 to fan out when the cover 19 is lifted, for easy insertion of the proper page under the top check.

Figure 8:
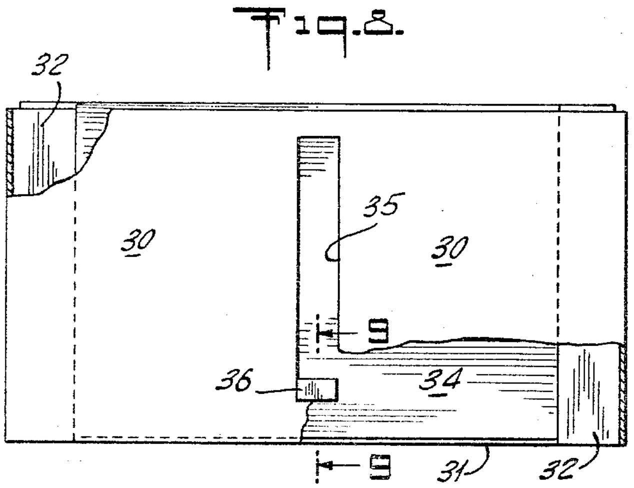
FIG. 8 is a bottom view, partly in section, of a slightly modified form of the present invention.
Figure 9:
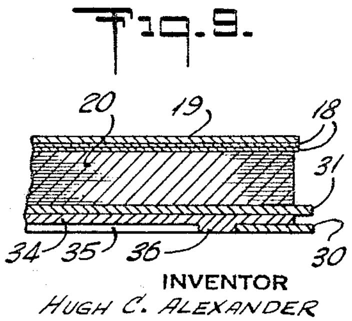
FIG. 9 is a partial section taken on line 9—9 of FIG. 8.

In FIG. 8 and 9 there is shown a slightly modified form of the present invention, differing from that described in details facilitating the sliding movement of the record booklet with respect to the check pad. As shown in these figures, the back or bottom of the structure is composed of two sheets of material 30 and 31 which are held in space relation by spacers 32, leaving an opening from top to bottom in which the members 34 carrying the record booklet may slide. A slot 35 is provided in the outer sheet member 30 and a suitable projection 36 is secured to the sheet 34 to serve as a stop to prevent complete withdrawal of the sheet 34 from between the sheet 30 and 31. The rest of the structure is substantially as was described above.

The mechanical details also are susceptible of modification without departing from the invention. The shown form is intended to be used until the pad of checks is exhausted, after which the record page booklet is detached and preserved with the later received canceled checks. It is perfectly possible to make the checks in a pad, with a heavy tongue on the back, for insertion into a more permanent structure corresponding to the base member 22, and to temporarily attach a record booklet to a member corresponding to the element 16, for a more elegant appearing checkbook intended for indefinite use.

In FIGS. 10 through 13 another modified embodiment of this invention is shown differing in the manner in which the booklet of record pages is formed.

Figures 10, 11, 12, 13:
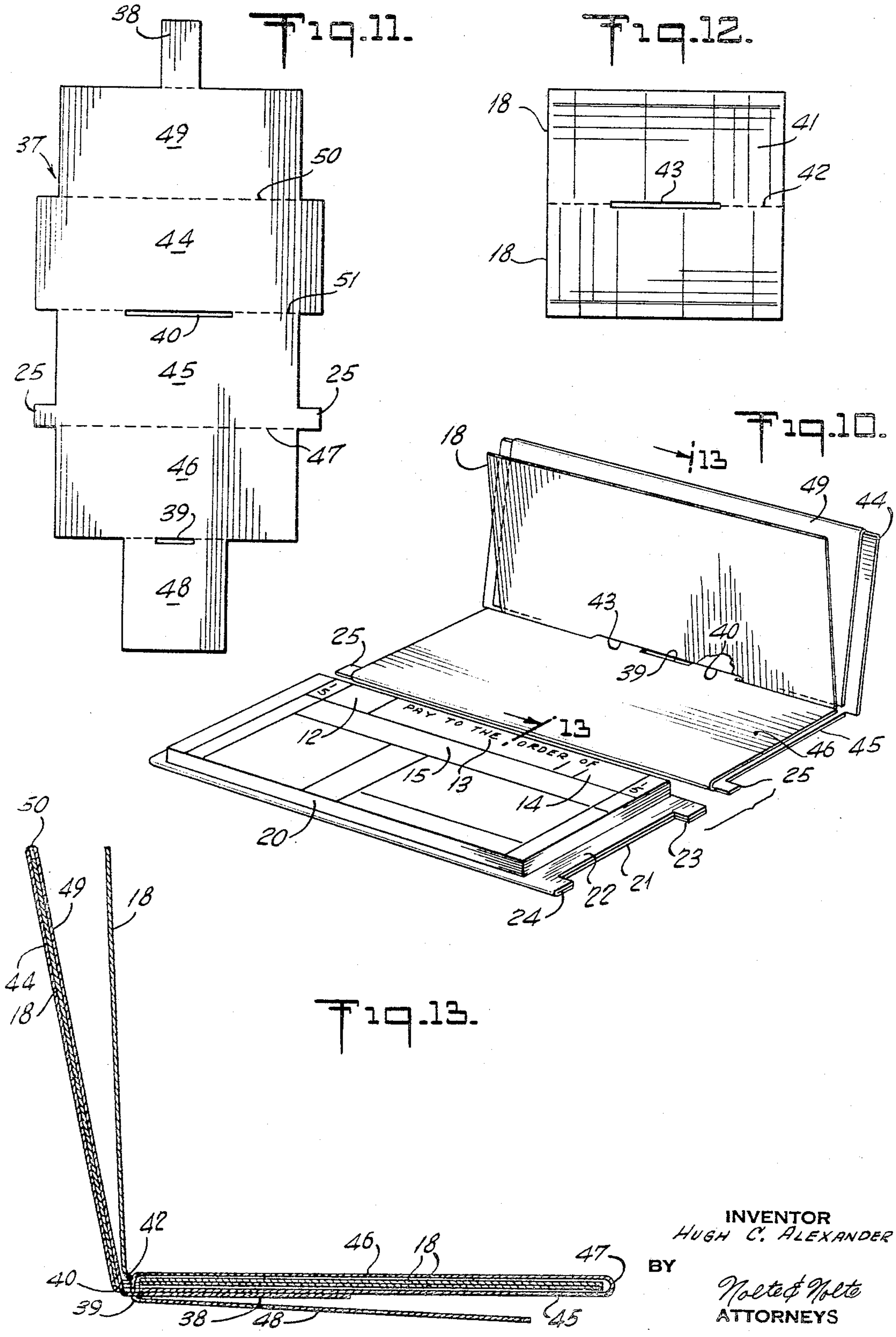
FIG. 10 shows a modified embodiment of this invention.
FIG. 11 is a development of a holder for the record pages as used in a modified form of the present invention as shown in FIG. 10.
FIG. 12 shows a sheet of record pages as used in the modification shown in FIG. 10.
FIG. 13 is a section taken on line 13—13 of FIG. 10.

The holder 37 for the record pages is formed from the development shown in FIG. 11. The record pages 18 are arranged in that two identical record pages are printed on one sheet 41 having the corresponding portions of each page in end to end relationship, joined at the fold 42 of the sheet 41.

These sheets 41 become enclosed in holder 37 by placing them upon holder portions 45 and 44 with slots 43 registering with slot 40. Folding portions 46 and 49 are folded along lines 47 and 50 respectively. They become attached to the holder when tongue 48 is placed through slots 43 of the record sheets and slot 40 of the holder.

The holder with a pack of record sheets attached is then ready for insertion into a holding means under a pad of checks. The holding means may take the form of the sliding means formed by 21 and 22 in FIGS. 1 and 10 or that shown in FIGS. 8 and 9, or other holding means.

It should be noted that only the bottom half of both the record holder and attached sheets 41 are in the slidable means, leaving the upper portion of both record holder and enclosed sheets 41 free to hinge. Flap 49 is now placed behind the hinged portion of the uppermost record sheet and tongue 38 is placed through slot 39, which is now aligned with slot 40, and the slots of the remaining pack of record sheets.

This places the upper portion of the first record sheet outside the record holder, so that the record sheet is now hingedly attached to the record holder but in a superimposed position over the pack of checks. This record sheet will move laterally over checks when the record holder is similarly moved to a predetermined fixed position. As this record sheet is moved, successive spaces thereon will be filled with image entries when consecutive checks are written. Once the record sheet is filled, tongue 48 is withdrawn from slot 40, the record sheet is inverted and tongue 48 is replaced in the slots. This unused portion will then be used for the recording of image entries in successive spaces until it is filled. Both tongues may then be withdrawn and the filled sheet may be moved to the back of pack. Tongue 48 is reinserted and tongue 38 is also reinserted but behind the now top sheet. This operation can be repeated until all of the pack of record sheets are filled, at which time all the record sheets are removed and a new pack enclosed and attached to the record holder.

While FIG. 13 shows tongue 38 through slot 40 and under portion 45, it may be found more convenient not to engage tongue 38 in slot 40 but to allow the tongue to slide over instead of under holder portion 45. Also, with certain weights of paper of the record sheets and holder, tongue 38 may have only little advantage when the tongue could be detached from portion 49 of the holder.

From what has been said it can be seen that there has been provided a unique form of check and record keeping device which assures the automatic entry of the pertinent data upon the making of any check. A particular advantage of the device is that inasmuch as there is no carbon paper, and the two pertinent pieces of paper are coated on one side only, there is no image forming except when a check is being written and then only if the check is moved above the record sheet. Since the inoperative position of the record sheet is above the pack of checks, no images will appear when calculations and other entries are made in the normal operation of totaling checks and determining balances.

Figures 14, 15:
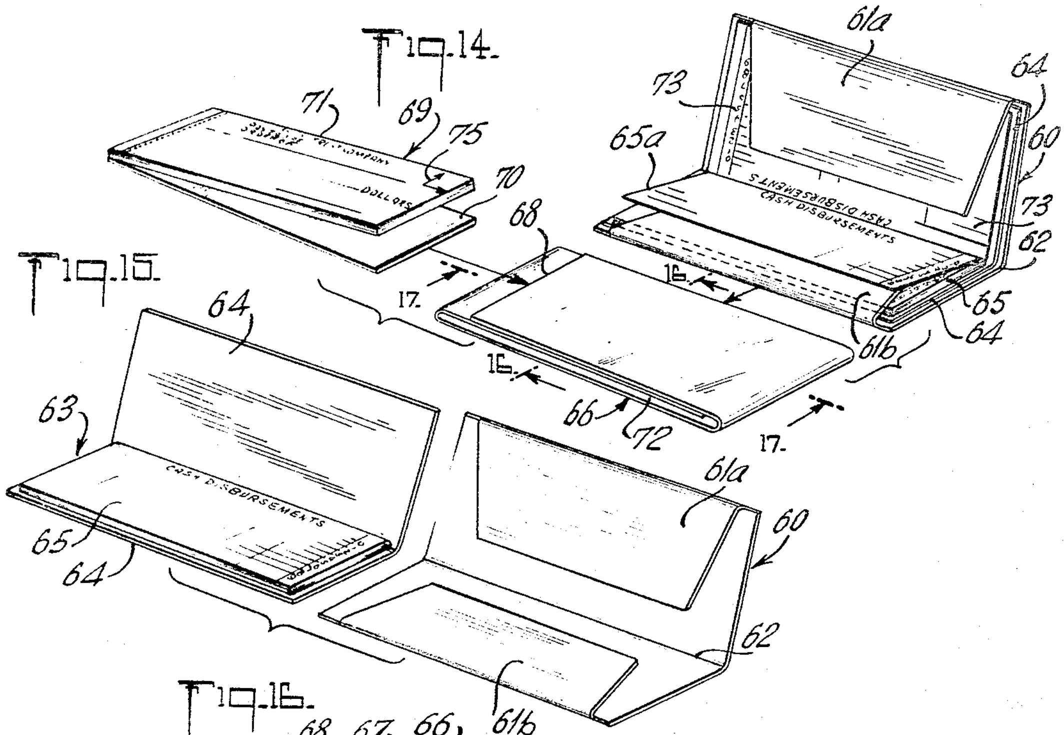
FIG. 14 is an exploded perspective view of a preferred embodiment of the present invention.
FIG. 15 is a perspective view of elements shown in FIG. 14.

Referring now to a preferred embodiment of the present invention shown in FIGS. 14–21, a cover 60 comprises flaps 61*a* and 61*b* which fold inward toward a crease 62, which crease 62 enables cover 60 to fold over on itself in half such that flap 61*a* can be in contact with flap 61*b*. Cover 60, as can be seen in FIG. 15 may be constructed so as to be symmetrical about crease 62, thereby enabling flaps 61*a* and 61*b* to be functionally interchangeable.

A recording assembly 63 is shown in FIG. 15 which comprises, in one embodiment, a backing sheet 64 which is made of a relatively rigid material such as cardboard, and a plurality of recording sheets 65 are secured to the backing sheet 64. As an example, recording sheets 65 may be stapled to a crease in the middle of backing sheet 64 such that the overall recording assembly 63 is symmetrical about said crease and, therefore, reversible. The recording sheets are pre-printed in a predetermined manner to facilitate recordation of desired information.

Upon assembly of the recording assembly 63 into the cover 60, either of flaps 61*a* or 61*b* is used to retain a half of backing sheet 64 plus any number of used recording sheets 65, while the other flap is used to retain and hold the other half of backing sheet 64 plus unused recording sheets 65. A single recording sheet 65*a* is permitted to remain free of flaps 61*a* and 61*b* when the present device is to be used.

Figure 16:
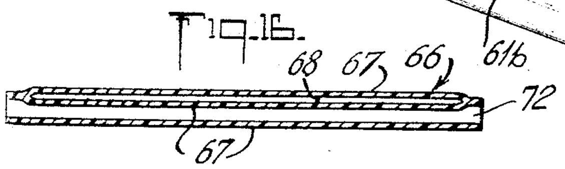
FIG. 16 is a view taken along the line 16—16 of FIG. 14.
Figure 17:
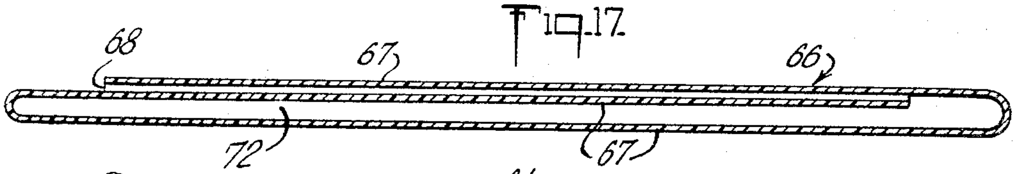
FIG. 17 is a view taken along the line 17—17 of FIG. 14.

A base assembly 66 is used in an embodiment of the present invention and comprises three substantially parallel sheets of desired material (FIGS. 14, 16 and 17). The overall shape of base assembly 66 is rectangular with upper two sheets 67 sealed along the long sides to form a pocket 68 to receive a base card 70 of a checkbook 69, which base card is easily inserted into pocket 68 to be retained until replaced. The pad of checks 71, located above said base card 70, rests upon top sheet 67 such that base assembly 66 may serve as a support for writing upon said checks 71.

Bottom two sheets 67 form a void or pocket 72 for slidably receiving a portion of the folded cover flap which retains unused record sheets plus one half of backing sheet 64. The second flap (61*a* or 61*b*) retains any number of used record sheets such as 73, shown in FIG. 18. As the recording sheets 65 are used up, the user of the present invention turns up the used sheet 73 under flap 61*a* (FIG. 18) and pulls out the next recording sheet from those retained by flap 61*b*.

Figure 18:
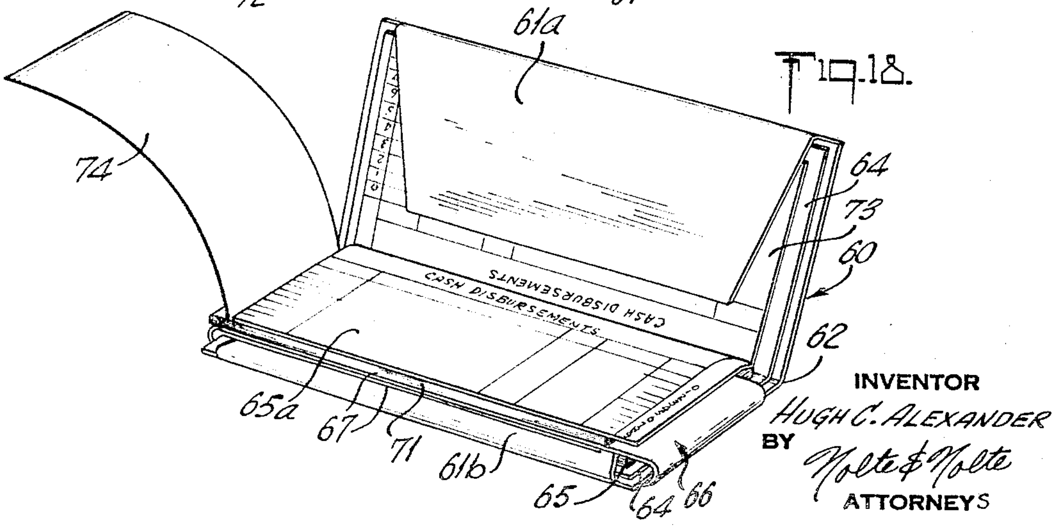
FIG. 18 is a perspective view of the embodiment of the present invention shown in FIG. 14 in an assembled condition.

FIG. 18 shows the assembled device in which a check 74 is ready to be written upon. Check 74 is pre-printed with desired information on one line such that a single line may contain the record of the name of the payee, the date of the check, and the amount of the check. All of checks in the pad 71 are pre-coated on their backs immediately under the aforementioned single line with pressure sensitive coating. The faces of recording sheets 65 are also coated such that when the coating on the back of the checks is in contact with the coating on the record sheets, and in addition the user writes on the single line containing desired information, an image will appear on the respective part of the record sheet. Of course the checks will contain all necessary information to render same negotiable and conforming to normal commercial practice.

Figures 19, 20, 21:
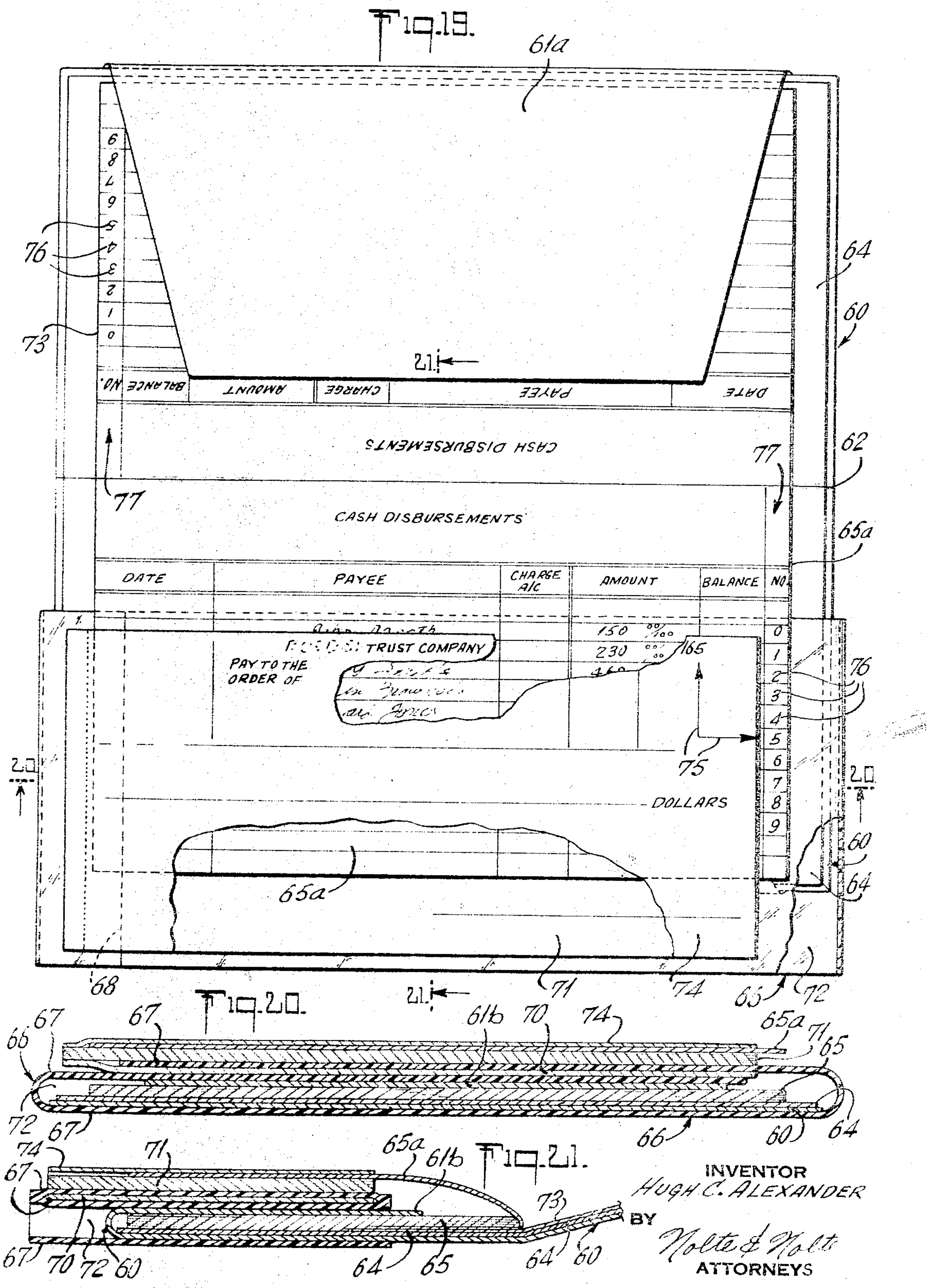
FIG. 19 is a partially broken plan view of the embodiment shown in FIG. 18 in an unfolded condition.
FIG. 20 is a view taken along the line 20—20 of FIG. 19.
FIG. 21 is a view taken along the line 21—21 of FIG. 19.

FIG. 19 shows the assembly shown in FIG. 18 unfolded, exposing the device in a position ready for use. Check 74 is positioned upon record sheet 65*a* in a manner to be described. Used or unused record sheet(s) are being retained under flap 61*a* of cover 60 and are printed such that the entire record assembly may be reversed and the backs of used sheets become new unused sheets.

Since a primary object of the present invention is to enable the user to simultaneously produce an image of the written data upon writing on each successive check by means of a sliding record assembly, the present invention utilizes cooperating indicia for alignment of each check with a corresponding line on recording sheets 65. Referring to FIG. 19, number 165 appears on check 74 and is an arbitrary representation of the number of each check. An arrow guide means 75 is printed on each check with one arrow (vertical) directed to the last digit of the number appearing on the check. The other arrow (horizontal) is directed to the edge of the check such that it will point to one number 76 of a series of numbers arranged in a column 77 on the face of record sheets 65 (65*a* in FIG. 19). It is seen in FIG. 19 that the last digit of the check number is 5 and the base assembly with inserts in its pockets has been slidably moved such that the horizontal arrow is pointing toward 5 in column 77. Once aligned as shown, the entry on check 74 may be made. The next check to be used in the series will have a number ending in 6 and thus the slidable portion is moved such that the horizontal arrow of arrow means 75 is aligned with 6 in column 77.

It is to be understood of course, that the device is capable of considerable modification without departing from the spirit of the invention. If a more conventional check were desired, with the date at the upper right, and the payee and amount on the next line, a slight rearrangement of the record page rulings will make this possible, although it may make the record less compact than that described above.

Also, other printed forms, such as bills, receipts and notes may be substituted for the checks.

The embodiments of the invention particularly disclosed are presented merely as examples of the invention. Other embodiments, forms and modifications of the invention coming within the proper scope of the appended claims will of course readily suggest themselves to those skilled in the art.

What is claimed is:

1. A checkbook and recorder wallet assembly comprising in combination: a pad of checks secured together on one edge and having a mounting portion, a record sheet assembly having a plurality of record sheets adapted to be inserted under a check in place on the pad, said record sheets being secured together on a different edge, said record assembly including a mounting portion, means mounting said mounting portion of said record assembly for slidable movement to register predetermined portions of said record sheets under assigned checks, said means mounting said record sheets comprising a base member slidably receiving said mounting portion of said record sheet assembly and including means for removing said pad of checks, indicia on the record sheets for alignment with indicia on the faces of the checks, and means producing an image on the record sheet upon writing on the upper check on the pad.

2. The combination according to claim 1, wherein the size of said pad of checks and the size of said recording assembly are substantially the same.

3. The combination according to claim 1, wherein said base member comprises a plurality of sheets.

4. The combination according to claim 1, wherein said record sheets are disposed in a predetermined different relation to each check during filling out, whereby columnar arrangement of check entries on the record sheets is effected.

5. The combination according to claim 1, wherein entry of data on each successive check produces a record on said record sheets in successive predetermined positions on the face of said record sheets.

6. A checkbook and recorder wallet assembly comprising in combination: a pad of checks secured together on one edge and having a mounting portion, a record sheet assembly having a plurality of record sheets adapted to be inserted under a check in place on the pad, said record sheets being secured together on a different edge, said record assembly including a mounting portion, means mounting said mounting portion of said record assembly for slidable movement to register predetermined portions of said record sheets under assigned checks, said means mounting said record sheets comprising a base member slidably receiving said mounting portion of said record sheet assembly and including means for removing said pad of checks, whereby a predetermined area of a record sheet under the top check of the pad and a predetermined area of a check may be registered, indicia means on said record sheet and said checks for indicating such registry, and means responsive to writing on the face of the check producing an image of such writing on the record sheet.

7. A checkbook and recorder wallet assembly comprising in combination: a stack of checks bearing first indicia in seriatim from one to the next with each indicia on each check being positioned at the same predetermined location, a record assembly bearing second indicia corresponding to said first indicia and being spaced one below the next, a cover having at least one flap for receiving a portion of said record assembly, and a base member for supporting said checks, said base member having means for slidably receiving a portion of said record assembly and a portion of said cover.

8. A checkbook and register assembly comprising in combination: a pad of checks having mounting means; register means comprising a backing sheet folded midway to form a mounting portion, a plurality of record sheets adapted for interchangeable contact with the topmost check in said pad of checks and further adapted to slidably register predetermined portions of said record sheets with predetermined checks; a base member having at least two sides comprising holding means on one side for holding the mounting means of said pad of checks, sliding means on another side for movably holding the mounting portion of said backing sheet; indicia on said record sheets for alignment with like indicia on the face of said checks; and means for producing an image on said record sheets upon writing on the uppermost check on said pad.

9. The combination according to claim 8, wherein the size of said pad of checks and the size of said recording assembly when folded are substantially the same.

10. The combination according to claim 8, wherein said record sheets are adapted to be inverted.

11. The combination according to claim 8, wherein entry of data on each successive check produces a record on said recond sheets in successive predetermined positions on the face of said record sheets.

12. The combination according to claim 8, wherein said register means comprise a flap for covering and protecting said record sheets during said slidable registry of said record sheets.

13. A checkbook and register assembly comprising in combination: a pad of checks secured together on one edge and having a mounting portion; a record sheet assembly having a plurality of record sheets adapted to be movably superimposed over said pad of checks, said record sheet assembly further comprising a backing sheet including a mounting portion, a folding cover portion, a plurality of record sheets secured to the mounting portion of said backing sheet; slidable means for mounting said mounting portion of said backing sheet, said slidable means adapted for slidable movement of said record sheets to register predetermined portions of said record sheets under assigned checks, indicia means on said record sheets and said checks for indicating registry; and means responsive to writing on the face of a check for producing an image of such writing on said record sheets.

14. The combination according to claim 13, wherein said record sheet assembly comprises a first flap for enclosing at least one record sheet of a first portion of said record sheet assembly for slidable cooperation with said slidable means, and a second flap for enclosing a portion of used record sheets.

15. The combination according to claim 13, wherein said pad of checks bear first indicia in seriatim from one to the next with each indicia on each check being positioned at the same predetermined location, said first indicia consisting of the last digit of successively numbered checks, and said record sheets bear second indicia corresponding to said first indicia and being spaced one below the next.

16. The combination according to claim 13, wherein said means for producing an image comprises complementary coatings on the face of said record sheets and on the backs of said checks.

17. The combination according to claim 13, wherein said checks include one line on which predetermined data may be written.

18. A checkbook and self-recording register comprising in combination: a pad of checks secured together on one edge, said checks being coated on the back thereof; a register assembly comprising a backing portion folded to produce a mounting portion and a cover portion, a plurality of record sheets hingedly secured to said backing portion, said record sheets being coated on the face thereof and adapted to superimpose said pad of checks in a non-image-operating position, a base member comprising holding means for holding said pad of checks, means for slidably receiving said mounting portion of said register assembly; and indicia disposed on one edge of said record sheets for alignment with the last digit of the number of said checks, said alignment occurring in an image-operating position.

19. A manifold checkbook and self-recording register assembly comprising in combination: a pad of checks secured together on one edge and having a mounting portion secured to the bottommost portion of said pad of checks; a record assembly, comprising a plurality of record sheets adapted to be movably superimposed over said pad of checks, said record sheets being creased to permit folding thereof in half, said record sheets being pre-printed on both sides thereof with predetermined data to permit said record assembly to be reversed within said checkbook, a backing sheet including a mounting portion secured to said record sheets to form a cover portion; slidable means for mounting said mounting portion of said backing sheet, said slidable means adapted for slidable movement of said record sheets to register predetermined portions of said record sheets under assigned checks, indicia means on said record sheets and said checks for indicating registry; and means responsive to writing on the face of a check for producing an image of such writing on said record sheets.

20. The combination according to claim 19, wherein said record sheet assembly comprises a first flap for enclosing at least one record sheet of a first portion of said record sheet assembly for slidable cooperation with said slidable means, and a second flap for enclosing a portion of used record sheets.

21. The combination according to claim 19, wherein said pad of checks bears first indicia in seriatim from one to the next with each indicia on each check being positioned at the same predetermined location, said first indicia consisting of the last digit of successively numbered checks, and said record sheets bear second indicia corresponding to said first indicia and being spaced one below the next.

22. The combination according to claim 19, wherein said means for producing an image comprises complementary coatings on the face of said record sheets and on the backs of said checks.

References Cited

UNITED STATES PATENTS

| | | | |
|---|---|---|---|
| 1,206,745 | 11/1916 | Winter | 283—58 X |
| 2,886,345 | 5/1959 | DuBrul | 282—27 |
| 3,141,684 | 7/1964 | Haber | 282—8 |
| 3,147,991 | 9/1964 | Heinz | 282—23 |
| 3,254,906 | 6/1966 | Moss | 282—23 |

LAWRENCE CHARLES, *Primary Examiner.*